(12) United States Patent
Inami et al.

(10) Patent No.: US 8,141,543 B2
(45) Date of Patent: Mar. 27, 2012

(54) ARRANGEMENT STRUCTURE OF VEHICLE-USE FUEL PUMP

(75) Inventors: Shigeto Inami, Wako (JP); Tsuneo Kajikawa, Wako (JP); Tadashi Oshima, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/678,742

(22) Filed: Feb. 26, 2007

(65) Prior Publication Data
US 2007/0200333 A1 Aug. 30, 2007

(30) Foreign Application Priority Data

Feb. 27, 2006 (JP) ................... 2006-051330

(51) Int. Cl.
*F02M 37/04* (2006.01)
(52) U.S. Cl. ...................... 123/495; 123/496
(58) Field of Classification Search .............. 123/509, 123/495, 197.1, 195 R, 46 R; 180/291, 68.3, 180/312, 830; 280/830; *F02M 37/04*
See application file for complete search history.

(56) References Cited

U.S. PATENT DOCUMENTS

| 7,445,075 B2* | 11/2008 | Ozawa et al. | 180/291 |
| 2001/0027890 A1* | 10/2001 | Bria et al. | 180/291 |
| 2005/0087175 A1* | 4/2005 | Hotta et al. | 123/470 |
| 2005/0150706 A1* | 7/2005 | Eguchi et al. | 180/291 |

FOREIGN PATENT DOCUMENTS

| JP | 2004-284473 A | 10/2004 |
| JP | 2005-219668 A | 8/2005 |
| JP | 2005-248887 A | 9/2005 |

* cited by examiner

*Primary Examiner* — Noah Kamen
*Assistant Examiner* — Keith Coleman
(74) *Attorney, Agent, or Firm* — Westerman, Hattori, Daniels & Adrian, LLP; William F. Westerman

(57) ABSTRACT

A vehicle has an engine and a fuel tank, which is located above the engine, mounted on a vehicle-body frame. A fuel pump, which supplies fuel is spaced-apart from the fuel tank and is located below the fuel tank and in front of the engine. Further, a center of the fuel pump in the vehicle-width direction is located so as to overlap a vehicle-body center line which extends in the longitudinal direction of the vehicle body. Additionally, the fuel pump is mounted on lower main frames, which are positioned below the vehicle body.

3 Claims, 9 Drawing Sheets

ARRANGEMENT STRUCTURE OF VEHICLE-USE FUEL PUMP

BACKGROUND OF THE INVENTION

The present invention relates to an improvement of the arrangement structure of a vehicle-use fuel pump.

As the conventional arrangement structure of a vehicle-use fuel pump, there has been known the arrangement structure which locates a fuel pump unit below a fuel tank; and to be more specific, at the right side in the vehicle-width direction from a position directly below a fuel tank by mounting the fuel pump unit on a shroud of a cooling fan (see JP-A-2005-219668 (hereinafter JP '668), for example).

As shown in FIG. 1, FIG. 5 and FIG. 7 of JP '668, a fuel pump unit 47 is configured such that a pair of upper and lower fixed portions 67, 67 are mounted on a front wall 65 and a right side wall 66 of a case body 57 respectively, and the fixed portions 67, 67 are mounted on a shroud of a cooling fan 46. Due to such a constitution, the fuel pump unit 47 is located below a fuel tank 13 and between a cooling fan 46 for forced cooling of an engine and an engine 5. Further, as shown in FIG. 9 (a front view) of the patent document 1, the fuel pump unit 47 is located at a right side in the vehicle-width direction from a position directly below the fuel tank 13.

The fuel pump unit 47 is a heavy-weight object and hence, in locating the unit in a vehicle, it is preferable to locate the unit at a position as low as possible for lowering the center of gravity of the vehicle. Further, to take the traveling performance such as the turning performance of a vehicle into consideration, it is preferable to arrange the unit as close as possible to the center of the vehicle body.

It is an object of the present invention to lower the center of gravity of a vehicle and, at the same time, to enhance the traveling performance of the vehicle by improving the arrangement structure of a fuel pump (or the position of the fuel pump in the vehicle structure).

SUMMARY OF THE INVENTION

In a vehicle in which an engine and a fuel tank located above the engine are mounted on a vehicle-body frame and a fuel pump, which supplies fuel to the engine from the fuel tank, is spaced-apart from the fuel tank, the fuel pump is located below the fuel tank and in front of the engine and, at the same time, is located on a vehicle-body center line as viewed in a plan view, and is mounted on the vehicle-body frame which is positioned below a vehicle body.

To explain the manner of operation of the arrangement structure of the vehicle-use fuel pump, by locating the fuel pump which is a heavy-weight object below the vehicle body, the center of gravity of the vehicle is lowered. Further, by locating the fuel pump on the vehicle-body center line as viewed in a plan view, the mass of the engine and the like and the fuel pump is concentrated at the vehicle-body center.

Further, the engine includes an oil tank storing oil which lubricates the inside of the engine, and the oil tank is located at the side of the fuel pump.

To explain the manner of operation of the arrangement structure of the vehicle-use fuel pump, the oil tank is a heavy-weight object and is located below the vehicle body together with the fuel pump and hence, the center of gravity of the vehicle is further lowered.

Additionally, the vehicle-body frame includes a triangular frame which is formed in a triangular shape as viewed in a side view on a front portion of the vehicle, and the fuel pump is located in the vicinity of the triangular frame and on a vehicle-body-center side of the triangular frame.

To explain the manner of operation of the arrangement structure of the vehicle-use fuel pump, the triangular frame has high rigidity and the fuel pump is arranged in the vicinity of the triangular frame and hence, the fuel pump is protected by the high-rigidity frame.

Furthermore, the triangular frame is constituted of a lower main frame which longitudinally extends in a lower portion of the vehicle body and supports the engine, an inclined frame which extends in an inclined manner in the forward and upward oblique direction from an intermediate portion of the lower main frame, and a down frame which extends in the substantially vertical direction from the lower main frame and is connected to the inclined frame.

To explain the manner of operation of the arrangement structure of the vehicle-use fuel pump, the lower main frame which constitutes the triangular frame has high rigidity for supporting the engine, and the tower main frame further increases rigidity due to the provision of the triangular frame and hence, the fuel pump can be arranged at the position surrounded by the high rigid frame. That is, the triangular frame may be used as a member for protecting the fuel pump.

Accordingly, the fuel pump is located below the fuel tank and in front of the engine and, at the same time, is located on the vehicle-body center line as viewed in a plan view, and is mounted on the vehicle-body frame which is positioned below the vehicle body. Accordingly, it is possible to lower the center of gravity of the vehicle and, at the same time, it is possible to enhance the traveling performance due the concentration of the mass of the vehicle.

The engine may also include an oil tank storing oil which lubricates the inside of the engine, and the oil tank is arranged at the side of the fuel pump and hence, it is possible to arrange the oil tank which is a heavy-weight object at a lower position of the vehicle whereby it is possible to further lower the center of gravity of the vehicle.

The vehicle-body frame may also include the triangular frame which is formed in a triangular shape as viewed in a side view on the front portion of the vehicle, and the fuel pump is located in the vicinity of the triangular frame and on the vehicle-body-center side of the triangular frame. Accordingly, it is possible to locate the fuel pump at the position which is surrounded by the frame having high rigidity and to use the triangular frame as a protective member.

Also, the triangular frame may be constituted of a lower main frame which longitudinally extends in the lower portion of the vehicle body and supports the engine, an inclined frame which extends in an inclined manner in the forward and upward oblique direction from an intermediate portion of the lower main frame, and a down frame which extends in the substantially vertical direction from the lower main frame and is connected to the inclined frame. Accordingly, it is possible to locate the fuel pump at a position which is surrounded by the triangular frame which includes the lower main frame which supports the engine and hence, it is possible to use the respective frames which form the triangular frame as the protective member.

DETAILED DESCRIPTION OF THE INVENTION

The present invention is explained hereinafter in conjunction with the attached drawings.

Figure 1:
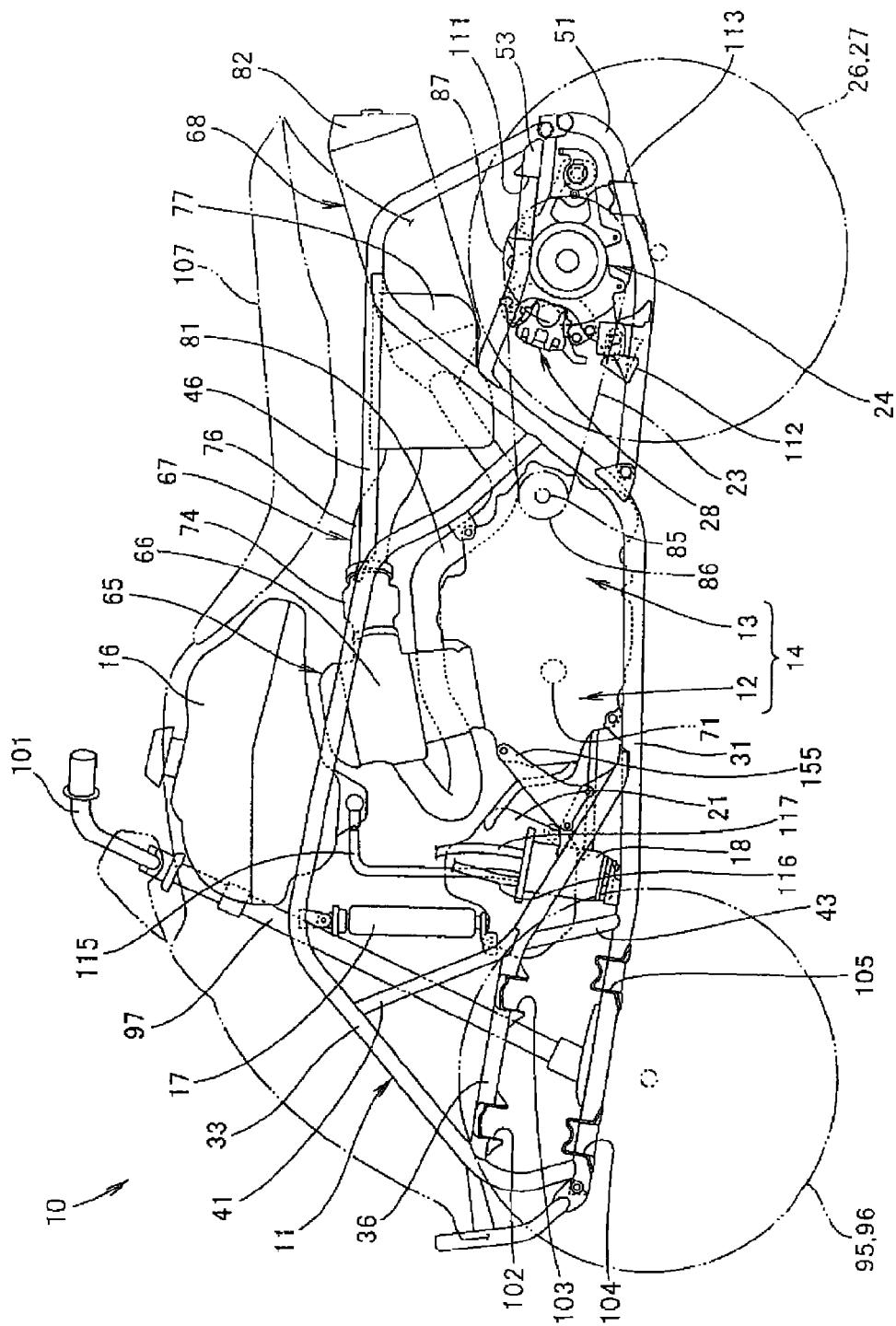
FIG. 1 is a side view of a vehicle having the arrangement structure for a fuel pump.

FIG. 1 is a side view of a vehicle according to the present invention. A vehicle 10 is a terrain traveling four-wheeled vehicle which is configured such that a power unit 14 which is constituted of an engine 12 and a transmission 13 which is integrally mounted on the engine 12 is mounted on a center portion of a vehicle body frame 11 which constitutes the frame structure, a fuel tank 16 is located above the power unit 14, a fuel pump 18, which supplies fuel from the inside of the fuel tank 16 to the engine 12, and an oil tank 21, which stores a lubricant which is used in the inside of the power unit 14, are located in a space defined below the fuel tank 16 and between a radiator 17 and the power unit 14. A speed reduction device 24, to which power is transmitted by way of a chain 23, is located behind the power unit 14. Further, a disc brake device 28 for applying braking to left and right rear wheels 26, 27 is attached to the speed reduction device 24.

The vehicle body frame 11 includes a pair of left and right lower main frames 31, 32 (indicated only by left-side reference numeral 31) which extend in a lower portion of the vehicle body in the longitudinal direction and support the power unit 14. Also, it includes a pair of left and right upper main frames 33, 34 (indicate only by left-side reference numeral 33), which are mounted on front ends and a rear portion of the lower main frames 31, 32, a pair of left and right side frames 36, 37 (indicated only by left-side reference numeral 36), which extend from front portions of the upper main frames 33, 34 to intermediate portions of the lower main frames 31, 32, upper reinforcing frames 41, 42 (indicated only by left-side reference numeral 41) which connect the side frames 36, 37 and the upper main frames 33, 34 respectively, and lower reinforcing frames 43, 44 (indicated only by left-side reference numeral 43) which connect the side frames 36, 37 and the lower main frames 31, 32 respectively, rear upper frames 46, 47 (indicated only by left-side reference numeral 46), which are respectively mounted on rear upper portions of the upper main frames 33, 34 and rear ends of the lower main frames 31, 32, rear lower frames 51, 52, (indicated only by left-side reference numeral 51) which respectively connect rear ends of the rear upper frames 46, 47, and rear lower portions of the lower main frames 31, 32, and rear sub frames 53, 54 (indicated only by left-side reference numeral 53) which are respectively mounted on rear portions of the lower main frames 31, 32 and the rear ends of the rear upper frames 46, 47.

The engine 12 is configured such that a cylinder head 66 is mounted on a cylinder portion 65 which projects upwardly, and an intake device 67 and an exhaust device 68 are mounted on the cylinder head 66. Here, numeral 71 indicates a crankshaft which is mounted on the engine 12.

The intake device 67 is constituted of a throttle body 74 which is mounted on a rear portion of the cylinder head 66, and an air cleaner 77 which is connected to the throttle body 74 by way of a connecting tube 76.

The exhaust device 68 is constituted of an exhaust pipe 81 which has one end thereof mounted on the cylinder head 66 and a muffler 82 which is connected to another end of the exhaust pipe 81.

The transmission 13 is configured such that an output shaft 85 is mounted on a rear side portion thereof in a projecting manner, a drive sprocket 86 is mounted on the output shaft 85, and a chain 23 is extended between the drive sprocket 86 and a driven sprocket 87 which is mounted on the speed reduction device 24 side.

In the drawing, reference numerals 95, 96 indicate front wheels, numeral 97 indicates a steering shaft which is rotatably mounted on the vehicle body frame 11 for steering the front wheels 95, 96, reference numeral 101 indicates a handle bar which is mounted on an upper end of the steering shaft 97, and reference numerals 102 to 105 indicate a pair of left and right front suspension arm brackets which are respectively mounted on the vehicle body frame 11 for supporting suspension arms for the front wheels 95, 96. Reference numeral 107 indicates a seat, numerals 111 to 113 indicate rear suspension arm brackets which are mounted on the vehicle body frame 11 for supporting suspension arms for rear wheels 26, 27, and numerals 115 to 117 indicate fuel hoses (a fuel supply pipe to the fuel pump 18 from the fuel tank 16, a fuel supply pipe to an injector not shown in the drawing mounted on the throttle body 74 from the fuel pump 18, and a return pipe to the fuel tank 16 from the fuel pump 18).

Figure 2:
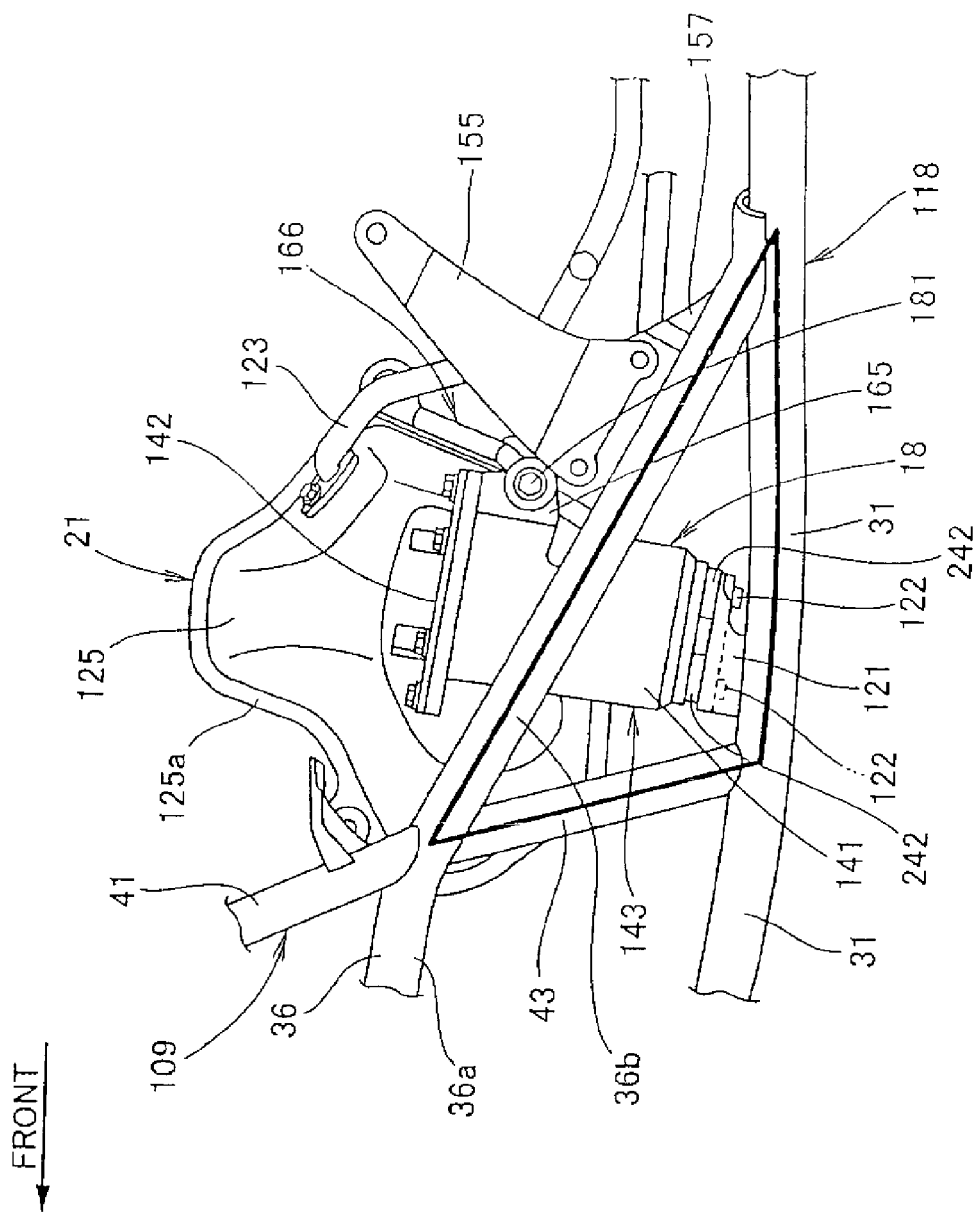
FIG. 2 is a side view of an essential part showing an arrangement of a fuel pump and an oil tank.

FIG. 2 is a side view of an essential part showing the arrangement of the fuel pump and the oil tank according to the present invention (an arrow (FRONT) in the drawing indicating a front side of the vehicle, the same definition being used hereinafter), wherein FIG. 2 shows the arrangement in which the fuel pump 18 and the oil tank 21 are overlapped with each other as viewed in a side view.

The side frame 36 is constituted of a suspension arm support frame 36a which constitutes a portion in front of a connecting portion between the upper reinforcing frame 41 and the lower reinforcing frame 43, and an inclined frame 36b which constitutes a portion behind the connecting portion between the upper reinforcing frame 41 and the lower reinforcing frame 43. The side frame 37 (not shown in the drawing) has the substantially same basic structure as the side frame 36.

The suspension arm support frame 36a supports the suspension arm, to be more specific, an upper arm out of the upper arm and a lower arm which constitute the suspension arm.

The inclined frame 36b is a frame which integrally extends from the suspension arm support frame 36a and is connected to a down frame explained later.

The upper reinforcing frame 41 and the lower reinforcing frame 43 constitute a down frame 109. Further, although not shown in the drawing, the upper reinforcing frame 42 (see FIG. 4) and the lower reinforcing frame 44 (see FIG. 4) which are arranged on a depth side of the upper reinforcing frame 41 and the lower reinforcing frame 43 constitute a down frame 110 (see FIG. 4).

The above-mentioned inclined frame 36b and a right-side inclined frame 37b (not shown in the drawing), the lower reinforcing frames 43, 44 and the lower main frames 31, 32 (indicated only by left-side reference numeral 31) are parts which form a pair of left and right triangular frames 118, 118 (indicated only by left-side reference numeral 118) having a triangular shape. Here, numeral 121 indicates a stay for mounting the fuel pump 18 on the lower main frames 31, 32 side, numerals 121, 122 indicate projecting portions which integrally project downwardly from a lower portion of a casing body 141 of the fuel pump 18 for positioning a lower portion of the fuel pump 18 with the stay 121 and are mounted on the stay 121 by way of rubber grommets 242, 242, and numeral 123 indicates an oil tube which connects the power unit 14 (see FIG. 1) and the oil tank 21.

Figure 3:
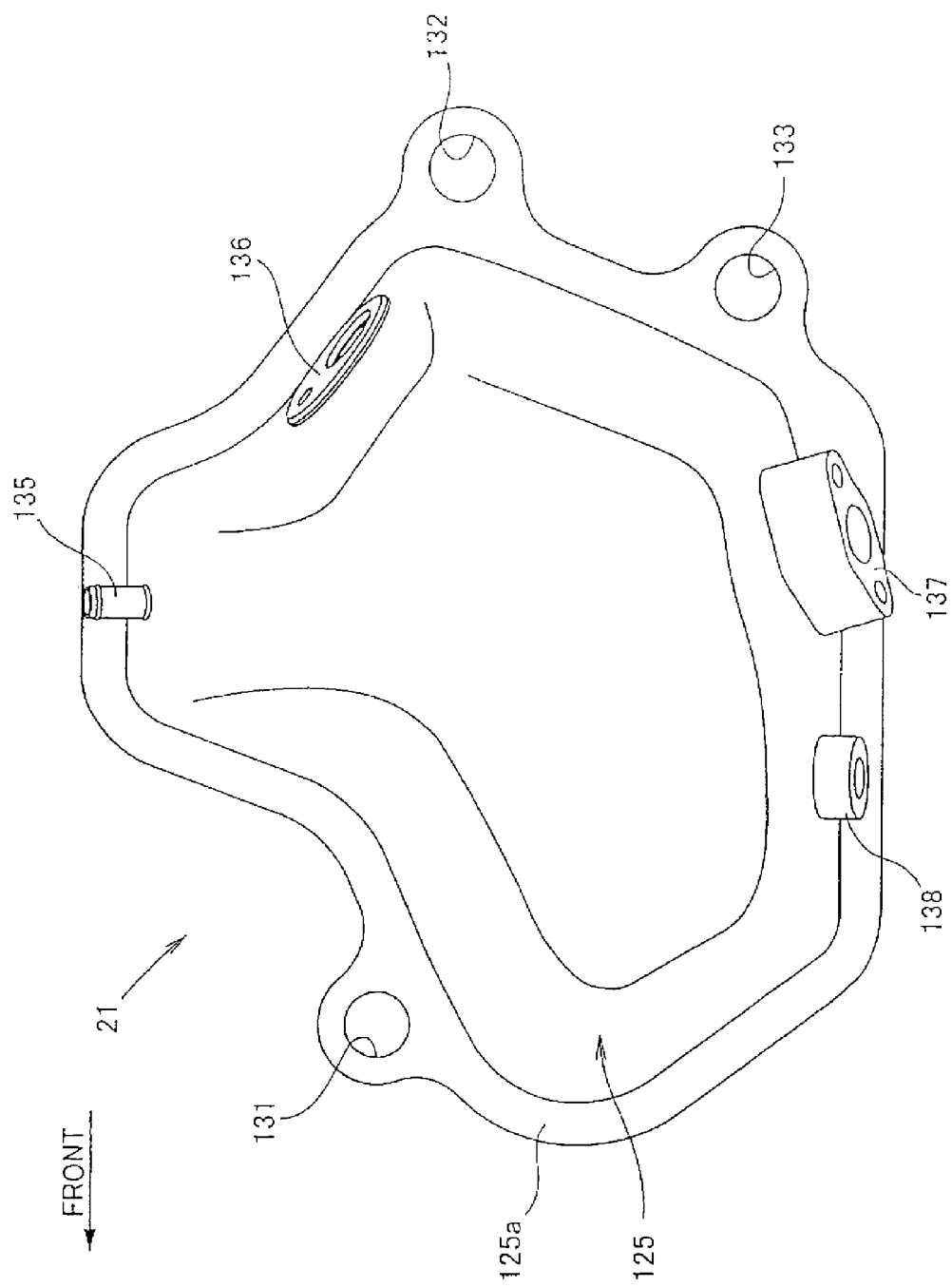
FIG. 3 is a side view of the oil tank.

FIG. 3 is a side view of the oil tank according to the present invention, wherein the oil tank 21 is a container which stores oil which lubricates the inside of the power unit 14 (see FIG. 1). The oil tank 21 is constituted by forming flanges 125a, 126a (not shown in the drawing, positioned on a depth side of the flange 125a) on respective peripheries of the left half body 125 and a right half body 126 (not shown in the drawing, positioned on the depth side of the left half body 125) and by joining the flange 125a and the flange 126a.

The flanges 125a, 126a are parts in which a front mounting hole 131, a rear upper mounting hole 132, and a rear lower mounting hole 133 are formed as three mounting holes formed in the vehicle body frame 11 (see FIG. 1) side.

In the drawing, numeral 135 indicates a ventilation pipe, numeral 136 indicates an upper joint member which is mounted on a rear upper wall of the left half body 125 for connecting an oil tube 123 (see FIG. 2), numeral 137 indicates a lower joint member which is provided separately from the oil tube 123 and is mounted on a lower portion of the left half body 125 for connecting an oil tube which is extended between the power unit 14 (see FIG. 1) and the oil tank 21, and numeral 138 indicates a drain portion which is mounted on a lower portion of the left half body 125 for taking out oil in the inside of the oil tank 21.

Figure 4:
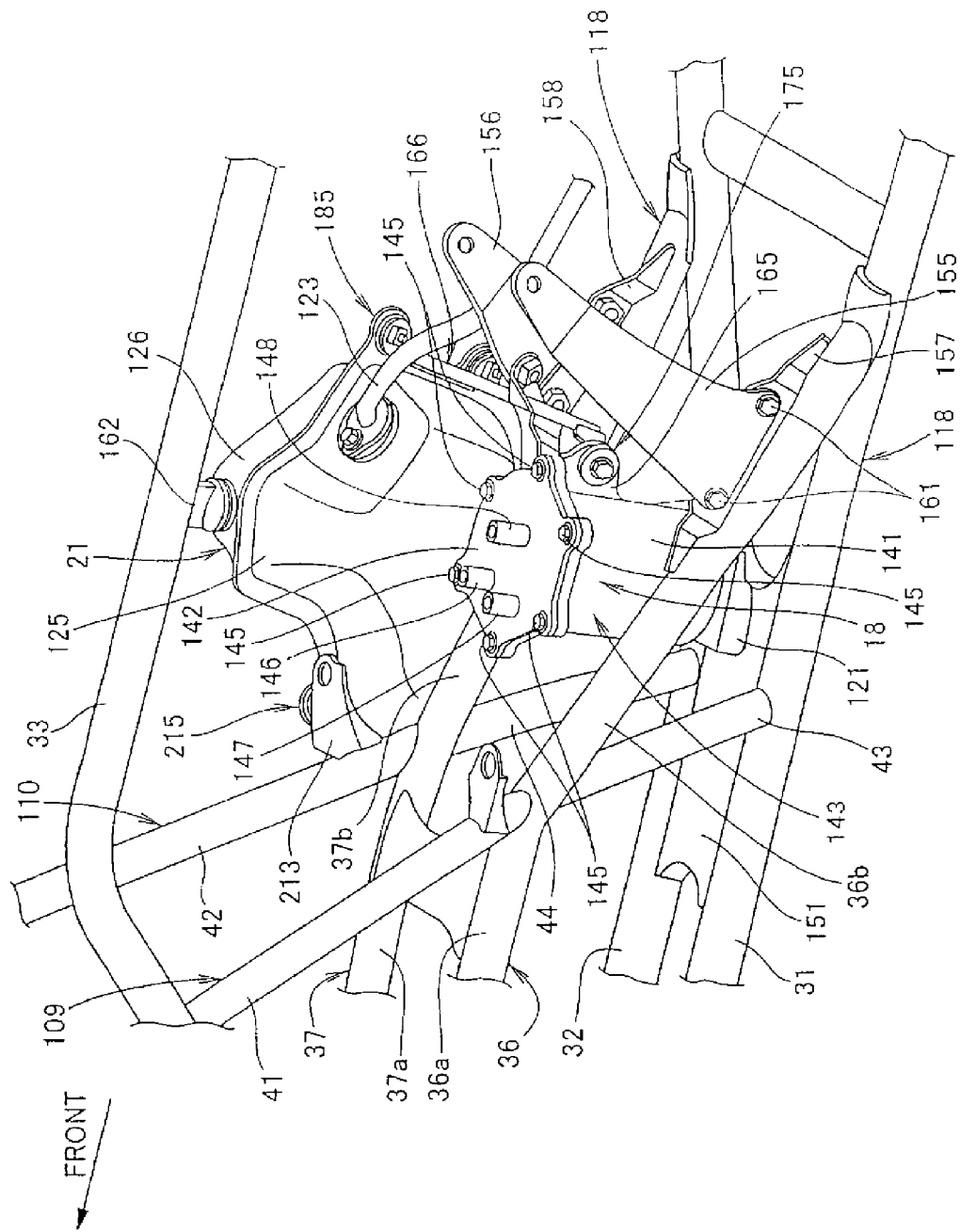
FIG. 4 is a first perspective view showing the fuel pump and the fuel tank.

FIG. 4 is a first perspective view showing the fuel pump and the fuel tank according to the present invention, wherein the fuel pump 18 includes a pump casing 143 which is constituted of a bottomed cylindrical casing body 141 and a casing cover 142 which closes an upper opening of the casing body 141. Here, a plurality of bolts 145 mount the casing cover 142 on the casing body 141. Reference numerals 146 to 148 indicate connection portions which are mounted on the casing cover 142 for connecting the fuel hoses 115 to 117 (see FIG. 1).

The left and right lower main frames 31, 32 are parts which are connected by a lower plate 151, and the casing body 141 of the fuel pump 18 is mounted on the lower plate 151 by way of the stay 121.

In this manner, by locating the fuel pump 18 in the vicinity of the triangular frames 118, 118 which possess a high rigidity, it is possible to firmly support the fuel pump 18 on the vehicle body frame 11.

In the drawing, reference numerals 155, 156 indicate a pair of left and right engine hangers for supporting a front portion (that is, the engine 12 (see FIG. 1)) of the power unit 14 (see FIG. 1), reference numerals 157, 158 indicate hanger brackets which are mounted on respective rear portions of the side frames 36, 37 for supporting the engine hangers 155, 156 using bolts 161, 161, and reference numeral 162 indicates a cap which closes an oil filling port of the oil tank 21.

As shown in FIG. 2 to FIG. 4, the present invention is characterized in that the pair of left and right triangular frames 118, 118 having a triangular shape toward the front side of the vehicle as viewed in a side view are provided to the vehicle body frame 11, and the fuel pump 18 is provided in the vicinity of the triangular frames 118, 118 and the vehicle body center side of the respective triangular frames 118, 118.

Due to such a constitution, it is possible to further increase the rigidity of the frame members in the vicinity of the triangular frames 118, 118 having the high rigidity, that is, the rigidity of the lower main frames 31, 32 and hence, the fuel pump 18 can be mounted at the position which is surrounded by the frame having the high rigidity whereby it is possible to use the triangular frames 118, 118 as protective members of the fuel pump 18.

Further, the present invention is characterized in that the triangular frames 118, 118 are constituted of the lower main frames 31, 32 which extend in the longitudinal direction in the lower portion of the vehicle body and support the engine 12, the inclined frames 36b, 37b which extend from the intermediate portions of the lower main frames 31, 32 in an inclined manner frontwardly and upwardly, and the down frames 109, 110 which extend in the substantially vertical direction from the lower main frames 31, 32 and are connected to the inclined frames 36b, 37b, to be more specific, the lower reinforcing frames 43, 44.

Due to such a constitution, the fuel pump 18 is protected by the triangular frames 118, 118 which include the lower main frames 31, 32 for supporting the engine 12 even when the fuel pump 18 is arranged in the lower portion of the vehicle body.

Figure 5:
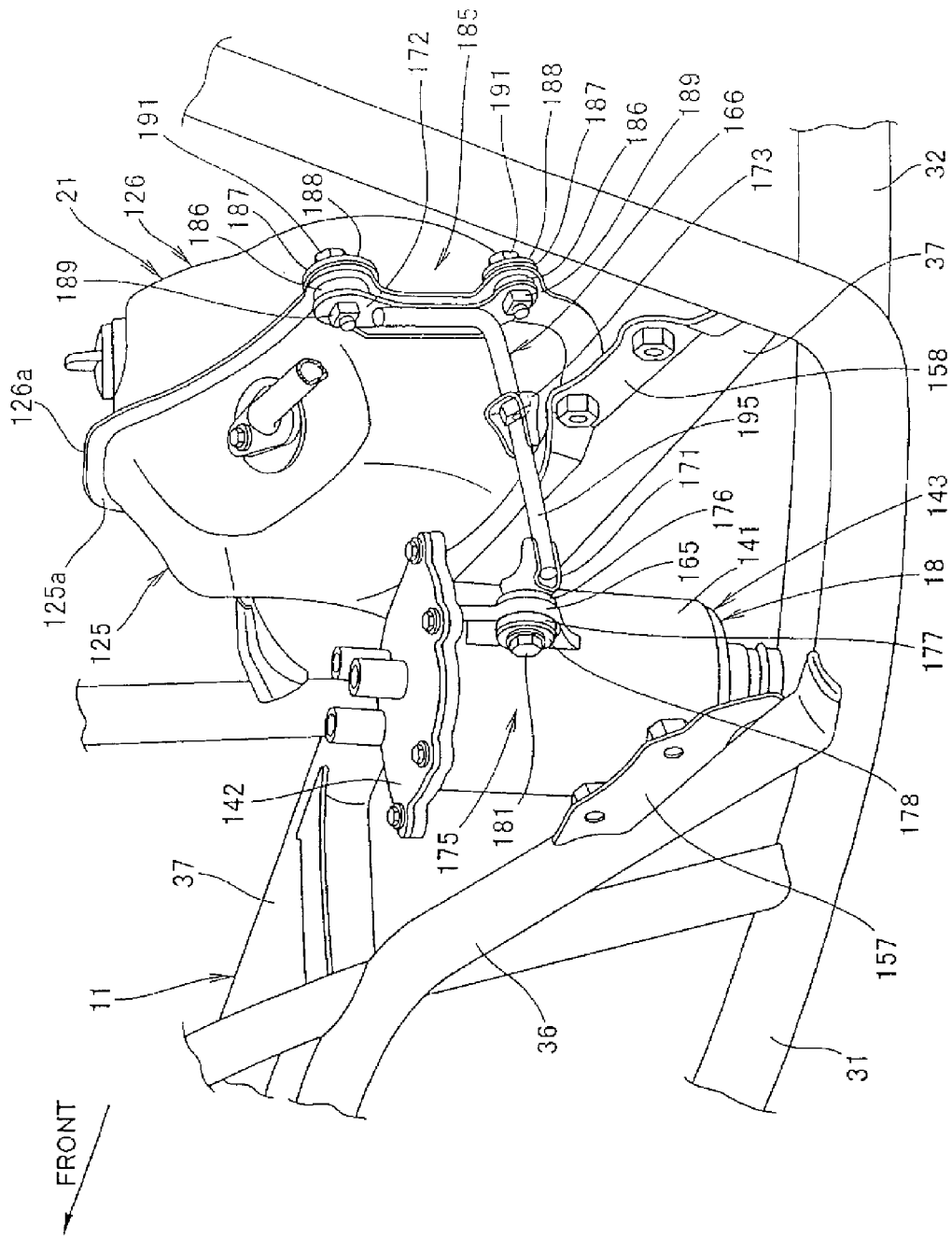
FIG. 5 is a second perspective view showing the fuel pump and the fuel tank.

FIG. 5 is a second perspective view showing the fuel pump and the fuel tank according to the present invention, wherein a rear projecting portion 165 which is mounted on a rear portion of the fuel pump 18 (to be more specific, the casing body 141) and flanges 125, 126 of the oil tank 21 are connected to each other by a connecting member 166, and an intermediate portion of the connecting member 166 is mounted on the engine hanger 156 out of a pair of left and right engine hangers 155, 156 (see FIG. 4).

To be more specific, FIG. 5 shows the constitution in which a pump-side bracket 171 is mounted on one end of the connecting member 166, a tank-side bracket 172 is mounted on another end side of the connecting member 166, a hanger-side bracket 173 is mounted on an intermediate portion of the connecting member 166, the pump-side bracket 171 is mounted on the rear projecting portion 165, and a tank-side bracket 172 is mounted on the flanges 125a, 126a using rear upper mounting holes 132 (see FIG. 3) and rear lower mounting holes 133 (see FIG. 3).

A connecting portion 175 of the rear projecting portion 165 and the pump-side bracket 171 includes disc-like cushion members 176, 177 which are brought into contact with both surfaces of the rear projecting portion 165, a washer 178 which is brought into contact with the cushion member 177, and a bolt 181 which is allowed to penetrate the washer 178, the cushion member 177, the rear projecting portion 165 and the cushion member 176 in this order and has a distal end thereof threaded into a nut which is welded to the pump-side bracket 171.

A connecting portion 185 of the flanges 125a, 126a and the tank-side bracket 172 includes cushion members 186, 187 which are brought into contact with both surfaces of the flanges 125a, 126a, a washer 188 which is brought into contact with the cushion member 187, and a pair of bolts 191 which are allowed to penetrate the washer 188, the cushion member 187, the flanges 125a, 126a and the cushion member 186 in this order and have distal ends thereof threaded into nuts 189 which are welded to the tank-side bracket 172.

As explained above, by connecting the fuel pump 18 and the oil tank 21 using the connecting member 166 and by mounting the connecting member 166 on the engine hanger 156, it is possible to easily and surely support the fuel pump 18 and the oil tank 21 without providing a frame member which constitutes the vehicle body frame 11 in the vicinities of the respective upper portions of the fuel pump 18 and the oil tank 21.

Further, compared to a case in which the fuel pump 18 and the oil tank 21 are respectively supported on different support members, the fuel pump 18 and the oil tank 21 can be supported using one connecting member 166 and hence, the number of parts can be reduced leading to the reduction of a manufacturing cost and weight.

Figure 6:
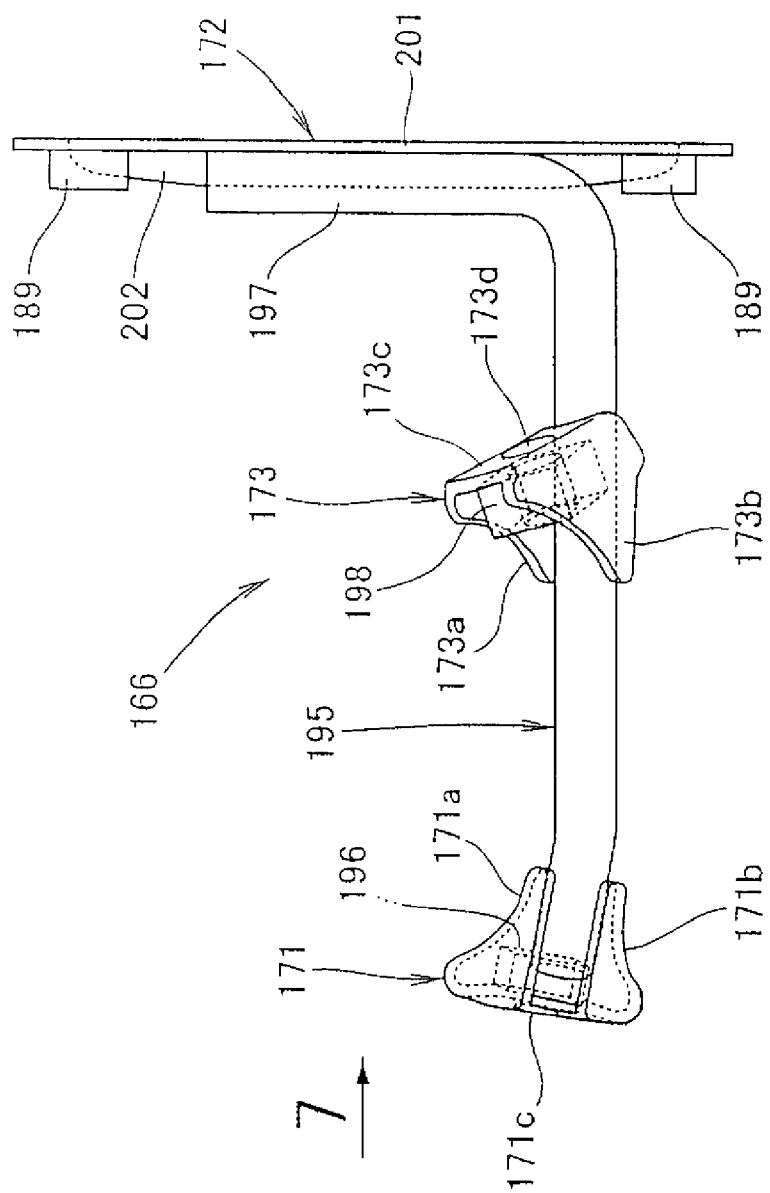
FIG. 6 is a back view of a connecting member.

FIG. 6 is a back view of the connecting member according to the present invention, wherein the connecting member 166 is constituted of a rod member 195 which has one end thereof slightly bent and another end bent in an L shape, a pump-side bracket 171 which is mounted on one end of the rod member 195, a nut 196 which is mounted on the pump-side bracket 171, a tank-side bracket 172 which is mounted on a bent portion 197 on another end of the rod member 195, nuts 189, 189 which are mounted on the tank-side brackets 172, and a hanger-side bracket 173 which is mounted on an intermediate portion of the rod member 195, and a nut 198 which is mounted on the hanger-side bracket 173.

The pump-side bracket 171 is constituted of bent portions 171a, 171b which are formed by bending both end portions of a plate, the bent portions 171a, 171b are welded to one end of the rod member 195, and a bolt insertion hole (not shown in the drawing) is formed in a flat portion 171c other than the bent portions 171a, 171b, and a nut 196 is welded to the bolt insertion hole such that female threads (not shown in the drawing) of the nut 196 face the bolt insertion hole.

The tank-side bracket 172 is a member which is constituted of a planar base portion 201 and a raised portion 202 which is formed by raising from the base portion 201, and welds nuts 189, 189 to both end portions of the base portion 201.

The hanger-side bracket 173 is constituted of bent portions 173a, 173b which are formed by bending both end portions of a plate, the bent portions 173a, 173b are welded to an intermediate portion of the rod member 195, and a bolt insertion hole 173d is formed in a flat portion 173c other than the bent portions 173a, 173b, and a nut 198 is welded to the bolt insertion hole such that female threads (not shown in the drawing) of the nut 198 face the bolt insertion hole 173d.

Figure 7:
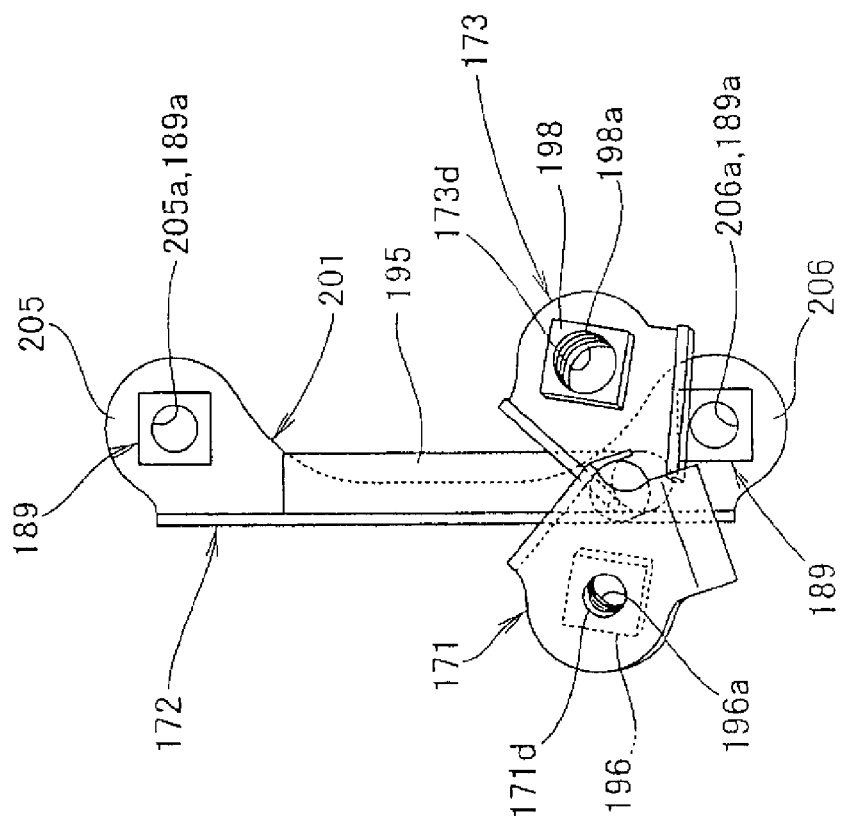
FIG. 7 is a view as viewed in the arrow 7 direction in FIG. 6.

FIG. 7 is a view as viewed in an arrow direction in FIG. 6, wherein the tank-side bracket 172 is configured such that circular end portions 205, 206 which are formed in an approximately circular shape are integrally formed on both ends of the base portion 201 by molding, bolt insertion holes 205a, 206a are opened in the circular end portions 205, 206, and nuts 189, 189 are formed on the circular end portions 205, 206. Here, numeral 171d indicates a bolt insertion hole, numerals 189a, 189a indicate respective female threads of the nuts 189, 189, numeral 196a indicates female threads of the nut 196, and 198a indicates female threads of the nut 198.

Figure 8:
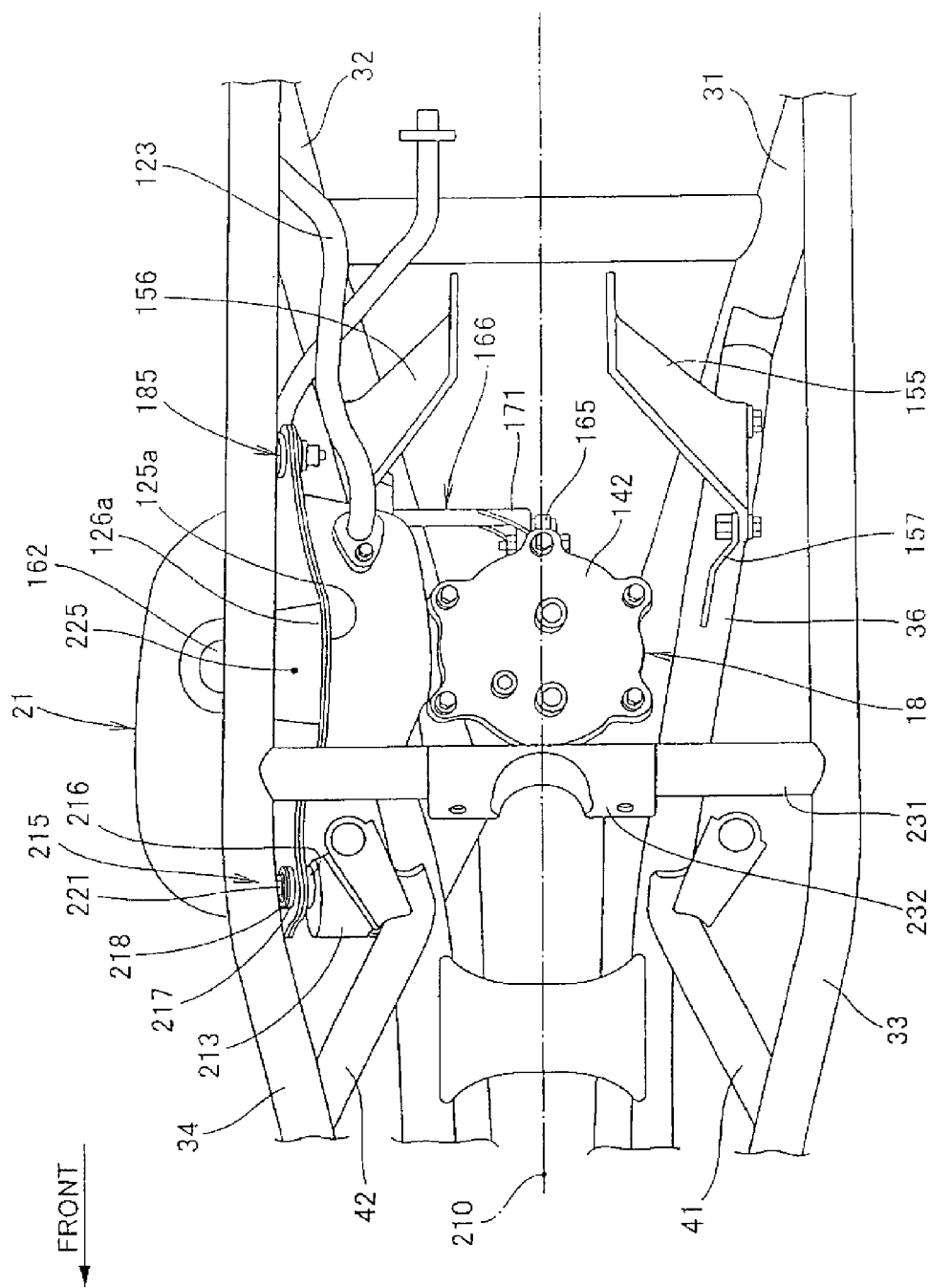
FIG. 8 is a plan view showing the fuel pump and the oil tank.

FIG. 8 is a plan view showing a fuel pump and an oil tank according to the present invention, wherein the fuel pump 18 is arranged on a vehicle-body center line 210 which extends in the longitudinal direction of the vehicle body, the oil tank 21 is arranged below the right upper main frame 34, the fuel pump 18 and the oil tank 21 are connected to each other by the connecting member 166 which extends in the vehicle-width direction, and the connecting member 166 is mounted on the right engine hanger 156.

Front portions of the flanges 125a, 126a of the oil tank 21 are mounted on the right upper reinforcing frame 42 by way of a bracket 213.

A connecting portion 215 of the bracket 213 and the flanges 125a, 126a includes cushion members 216, 217 which are brought into contact with both surfaces of the flanges 125a, 126a, a washer 218 which is brought into contact with the cushion member 217, and a bolt 221 which is allowed to penetrate the washer 218, the cushion member 217, the flanges 125a, 126a and the cushion member 216 in this order and has a distal end thereof threaded into a nut (not shown in the drawing) which is welded to the bracket 213. Here, numeral 231 indicates a cross member which is extended between the left and right upper main frames 33, 34, and numeral 232 indicates a shaft support bracket which is mounted on the cross member 231 which rotatably supports an upper portion of the steering shaft 97 (see FIG. 1).

As described above, the fuel pump 18 which is a heavyweight object is arranged at a center in the vehicle-width direction and, further, center of gravity 225 (center of gravity in a state that oil is filled in the inside of the oil tank 21, being shown by black point) of the oil tank 21 having a heavy weight is arranged substantially within a width of the vehicle body frame 11 and hence, it is possible to realize a concentration of a mass thus enhancing the vehicle traveling performance such as a turning performance.

As shown in FIG. 1, FIG. 4 and FIG. 8 heretofore, in the vehicle 10 in which the engine 12 and the fuel tank 16, which is located above the engine 12, are mounted on the vehicle-body frame 11. The fuel pump 18, which supplies fuel to the engine 12 from the fuel tank 16, is spaced-apart from the fuel tank 16. The fuel pump 18 is located below the fuel tank 16 and in front of the engine 12 and, at the same time, is located on the vehicle-body center line 210 as viewed in a plan view, and is mounted on the vehicle-body frame 11 which is positioned below a vehicle body, to be more specific, on the lower main frames 31, 32.

Accordingly, it is possible to lower the center of gravity of the vehicle 10 and, at the same time, it is possible to enhance the traveling performance of the vehicle 10 due to the concentration of the mass of the vehicle 10.

Further, the engine 12 includes the oil tank 21 storing oil which lubricates the inside of the engine 12, and the oil tank 21 is located at the side of the fuel pump 18. Accordingly, it is possible to locate the oil tank 21 having the heavy weight at the lower position of the vehicle 10 whereby it is possible to further lower the center of gravity of the vehicle 10.

Figure 9:
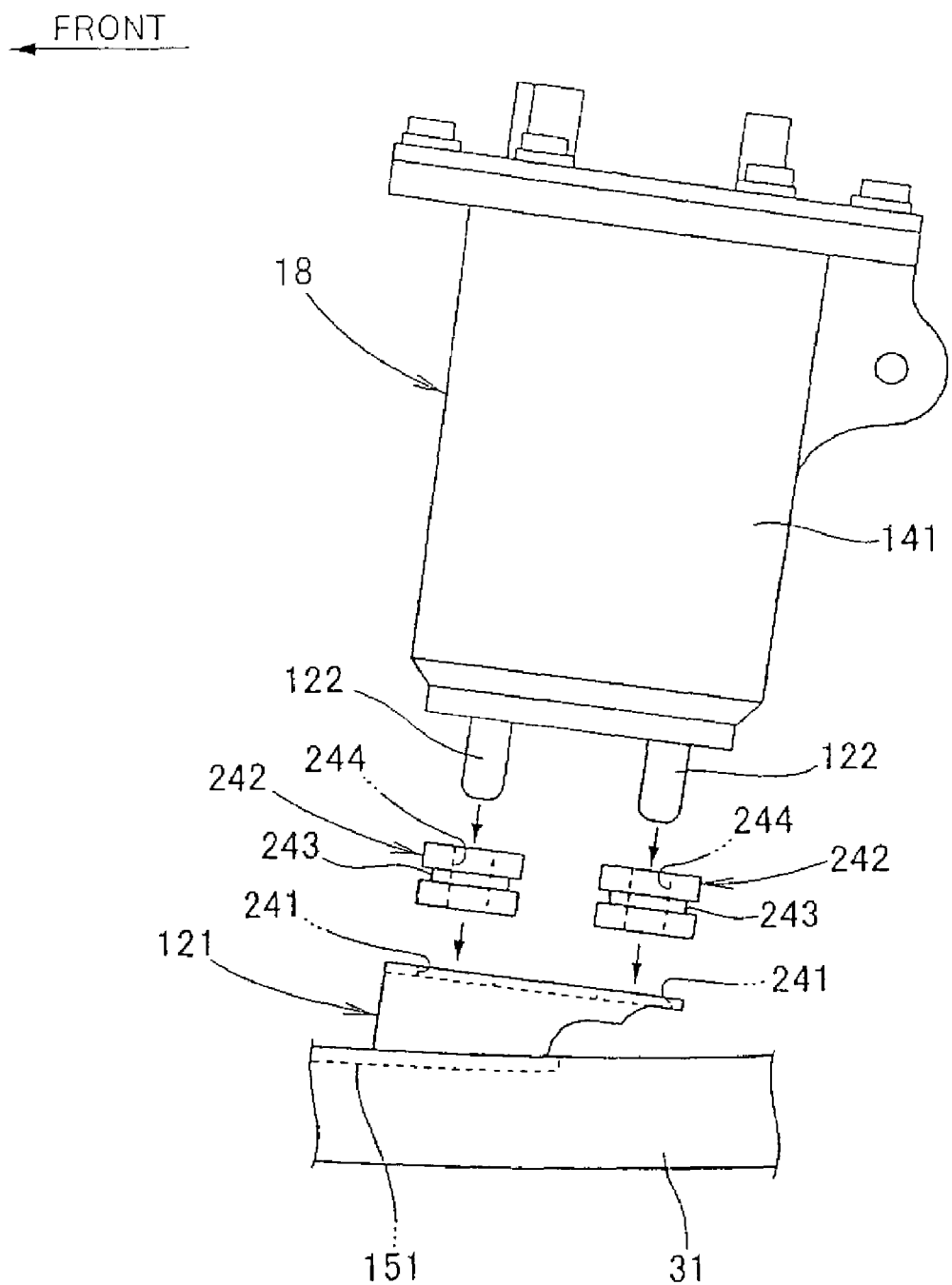
FIG. 9 is a side view showing the support structure of the lower portion of the fuel pump.

FIG. 9 is a side view showing the support structure of a lower portion of the fuel pump. The stay 121 is a member which forms hole portions 241, 241 in front and rear portions thereof.

In the drawing, reference numerals 242, 242 indicate cylindrical rubber grommets. The rubber grommets 242 respectively have annular grooves 243 in outer peripheral surface thereof and have penetration holes 244 in the axial directions thereof.

To assemble the lower portion of the fuel pump 18 to the stay 121, first of all, the annular grooves 243, 243 of the rubber grommets 242, 242 are fitted in the hole portions 241, 241 of the stay 121.

Next, the projecting portions 122, 122 of the casing body 141 are respectively inserted into the penetration holes 244, 244 of the rubber grommets 242, 242.

The interior diameter of the penetration hole 244 is set to equal to or slightly less than an external diameter of the projecting portion 122 and hence, it is possible to hold the projecting portion 122 in the penetration hole 244 without play.

Here, in this embodiment, as shown in FIG. 4 and FIG. 5, the hanger-side bracket 173 is mounted on the intermediate portion of the connecting member 166 and the hanger-side bracket 173 is mounted on the intermediate portion of the engine hanger 156. However, the present invention is not limited to the above-mentioned embodiment, for example, a bracket which merely forms a bolt penetration hole therein and does not mount a nut thereon may be mounted on the intermediate portion of the connecting member 166, and the bracket may be fastened to the connection portion of the hanger bracket 158 and the engine hanger 156 using at least one bolt 161 out of the bolts 161, 161 together.

Further, the side frame 36 is a member which is integrally formed of the suspension arm support frame 36*a* and the inclined frame 36*b*. However, it is not limited to the above-mentioned constitution, and the suspension arm support frame 36*a* and the inclined frame 36*b* may be individually connected to the down frame 109.

Further, the upper reinforcing frame 41 and the lower reinforcing frame 43 which constitute the down frame 109 are formed as separate members from each other. However, it is not limited to the above-mentioned constitution, and the upper reinforcing frame 41 and the lower reinforcing frame 43 may be connected to the side frame 36 in a state that the upper reinforcing frame 41 and the lower reinforcing frame 43 are integrally formed with each other.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A vehicle structure for a vehicle-use fuel pump, comprising:
   a four wheeled vehicle;
   an engine mounted in the vehicle wherein said engine includes an oil tank for storing engine oil;
   a fuel tank mounted in the vehicle, above said engine; and
   a fuel pump mounted on a vehicle-body frame and being spaced apart from said fuel tank, wherein said fuel pump is located below said fuel tank and in front of said engine, said fuel pump also being located on a vehicle-body center line as viewed in a top plan view;
   wherein said oil tank is located directly laterally with respect to said fuel pump,
   wherein said vehicle-body frame is positioned below a body of the vehicle and includes a pair of opposing triangular frames, as viewed in a side view, disposed on a front portion of the vehicle, each triangular frame having a lower frame side, an inclined frame side, and a down frame side, such that at least a portion of each one of said pair of opposing triangles overlaps a front tire of the vehicle as viewed in a side view, and further wherein at least a portion of said fuel pump is located in between said triangular frames in overlapping fashion, as viewed in a side view, and
   wherein a pair of lower main frames longitudinally extend in a lower portion of the vehicle body and support said engine, and each of said lower main frames includes said lower frame side of each of said triangular frames;
   said inclined frame side extends in an inclined manner in a forward and upwardly oblique direction from an intermediate portion of each of said lower main frames; and
   said down frame side extends in a substantially vertical direction from each of said lower main frames and is connected to each inclined frame side.

2. The vehicle structure of claim 1, wherein a lower portion of said fuel pump is positioned substantially adjacent said lower main frames.

3. The vehicle structure of claim 1, wherein said fuel pump and said oil tank are connected to one another by a connecting member.

* * * * *